United States Patent
Kataoka

(10) Patent No.: US 12,537,412 B2
(45) Date of Patent: Jan. 27, 2026

(54) MOTOR AND PUMP

(71) Applicant: NIDEC POWERTRAIN SYSTEMS CORPORATION, Zama (JP)

(72) Inventor: Shigehiro Kataoka, Zama (JP)

(73) Assignee: NIDEC POWERTRAIN SYSTEMS CORPORATION, Kanagawa (JP)

(*) Notice: Subject to any disclaimer, the term of this patent is extended or adjusted under 35 U.S.C. 154(b) by 192 days.

(21) Appl. No.: 18/426,719

(22) Filed: Jan. 30, 2024

(65) Prior Publication Data

US 2024/0258863 A1 Aug. 1, 2024

(30) Foreign Application Priority Data

Feb. 1, 2023 (JP) .................................. 2023-014079

(51) Int. Cl.
*H02K 3/50* (2006.01)
*H02K 1/16* (2006.01)
*H02K 3/34* (2006.01)

(52) U.S. Cl.
CPC ................. *H02K 3/50* (2013.01); *H02K 1/16* (2013.01); *H02K 3/34* (2013.01); *H02K 2203/03* (2013.01); *H02K 2203/06* (2013.01)

(58) Field of Classification Search
CPC .......... H02K 3/50; H02K 3/34; H02K 2203/03
See application file for complete search history.

(56) References Cited

U.S. PATENT DOCUMENTS

| | | | |
|---|---|---|---|
| 10,615,671 B2* | 4/2020 | Endo | H02K 1/16 |
| 10,938,262 B2* | 3/2021 | Hattori | H02K 9/227 |
| 11,855,517 B2* | 12/2023 | Aoyagi | H02K 5/225 |
| 2021/0013763 A1* | 1/2021 | Kobayashi | H02K 21/16 |
| 2021/0013782 A1* | 1/2021 | Kobayashi | F04B 39/121 |
| 2022/0140685 A1* | 5/2022 | Mawatari | H02K 3/12 310/195 |
| 2022/0190688 A1* | 6/2022 | Feldkamp | H02K 11/33 |

* cited by examiner

Primary Examiner — Alexander Talpalatski
(74) Attorney, Agent, or Firm — Keating & Bennett, LLP

(57) ABSTRACT

A motor assembly includes a rotor rotatable about a central axis and a stator radially opposing the rotor with a gap interposed therebetween, a circuit board on a first side in an axial direction from the motor assembly, and a connection terminal electrically connecting the stator and the circuit board. The stator includes a stator core, an insulating portion attached to the stator core to hold the connection terminal, and a coil portion including a coil body attached to the stator core with the insulating portion interposed therebetween, and a coil lead wire drawn out from the coil body. The connection terminal includes a board connector connected to the circuit board, a groove allowing the coil lead wire to be inserted through the groove, and a fixture in contact with the insulating portion in the axial direction.

8 Claims, 9 Drawing Sheets

MOTOR AND PUMP

CROSS-REFERENCE TO RELATED APPLICATIONS

The present application claims priority under 35 U.S.C. § 119 to Japanese Patent Application No. 2023-014079, filed on Feb. 1, 2023, the entire contents of which are hereby incorporated herein by reference.

1. Field of the Invention

The present disclosure relates to a motor and a pump.

2. Background

Electric motors have been conventionally known in each of which a winding and a crimp terminal are electrically connected by press-fitting the winding into an inner surface of a conducting groove of the crimp terminal by inserting the crimp terminal into a cavity provided in an insulating portion while the winding of a stator is held in a wire restraining groove provided in the insulating portion.

The electric motors as described above may have an unstable electrical connection between the winding and the crimp terminal due to difficulty of increasing a contact area between the winding and the inner surface of the conducting groove. Additionally, the conducting groove located in the cavity of the insulating portion causes difficulty of visually recognizing a contact state between the inner surface of the conducting groove and the winding.

SUMMARY

An example embodiment of a motor according to the present disclosure includes a motor assembly including a rotor rotatable about a central axis and a stator radially opposing the rotor with a gap interposed between the rotor and the stator, a circuit board located on a first side in an axial direction from the motor assembly, and a connection terminal electrically connecting the stator and the circuit board. The stator includes a stator core in an annular shape, an insulating portion attached to the stator core to hold the connection terminal, and a coil portion including a coil body attached to the stator core with the insulating portion interposed between the stator core and the coil body, and a coil lead wire drawn out from the coil body. The connection terminal includes a board connector connected to the circuit board, a groove recessed in a direction intersecting the axial direction to allow the coil lead wire to be inserted through the groove along a radial direction, and a fixture in contact with the insulating portion in the axial direction. The coil lead wire is press-fitted into the groove, the insulating portion includes a wall portion opposing the groove in the radial direction and extending in the axial direction, and the wall portion includes a lead wire contact portion that is located on the first side in the axial direction from a surface of the groove opposing the first side in the axial direction and in contact with the coil lead wire in the axial direction.

An example embodiment of a pump apparatus according to the present disclosure includes the motor and a pump connected to the rotor.

The above and other elements, features, steps, characteristics and advantages of the present disclosure will become more apparent from the following detailed description of the example embodiments with reference to the attached drawings.

DETAILED DESCRIPTION

The drawings each illustrate a Z-axis appropriately in description below. The Z-axis indicates a direction in which a central axis J of an example embodiment described below extends. The central axis J illustrated in each drawing is a virtual axis. The description below shows a direction in which the central axis J extends, or a direction parallel to the Z-axis, the direction being referred to as an "axial direction". A radial direction about the central axis J is simply referred to as a "radial direction". A circumferential direction about the central axis J is simply referred to as a "circumferential direction". The axial direction includes a side (+Z side) toward which an arrow of the Z-axis is directed, the +Z side being referred to as an "upper side" or a "first side in the axial direction". The axial direction includes a side (−Z side) opposite to the side toward which the arrow of the Z-axis is directed, the −Z side being referred to as a "lower side" or a "second side in the axial direction". The radial direction includes a side facing the central axis J, the side being referred to as a "first side in the radial direction". The upper side and the lower side are terms for simply describing a relative positional relationship of components, so that an actual placement relationship and the like may be other than the placement relationship and the like indicated by these terms.

The circumferential direction is indicated by an arrow θ in each drawing. The circumferential direction includes a side (+θ side) toward which the arrow θ is directed, the +θ side being referred to as a "first side in the circumferential direction". The circumferential direction includes a side (−θ side) opposite to the side toward which the arrow θ is directed, the −θ side being referred to as a "second side in the circumferential direction". The first side in the circumferential direction advances counterclockwise about the central axis J when viewed from the upper side. The second side in the circumferential direction advances clockwise about the central axis J when viewed from the upper side.

Figure 1:
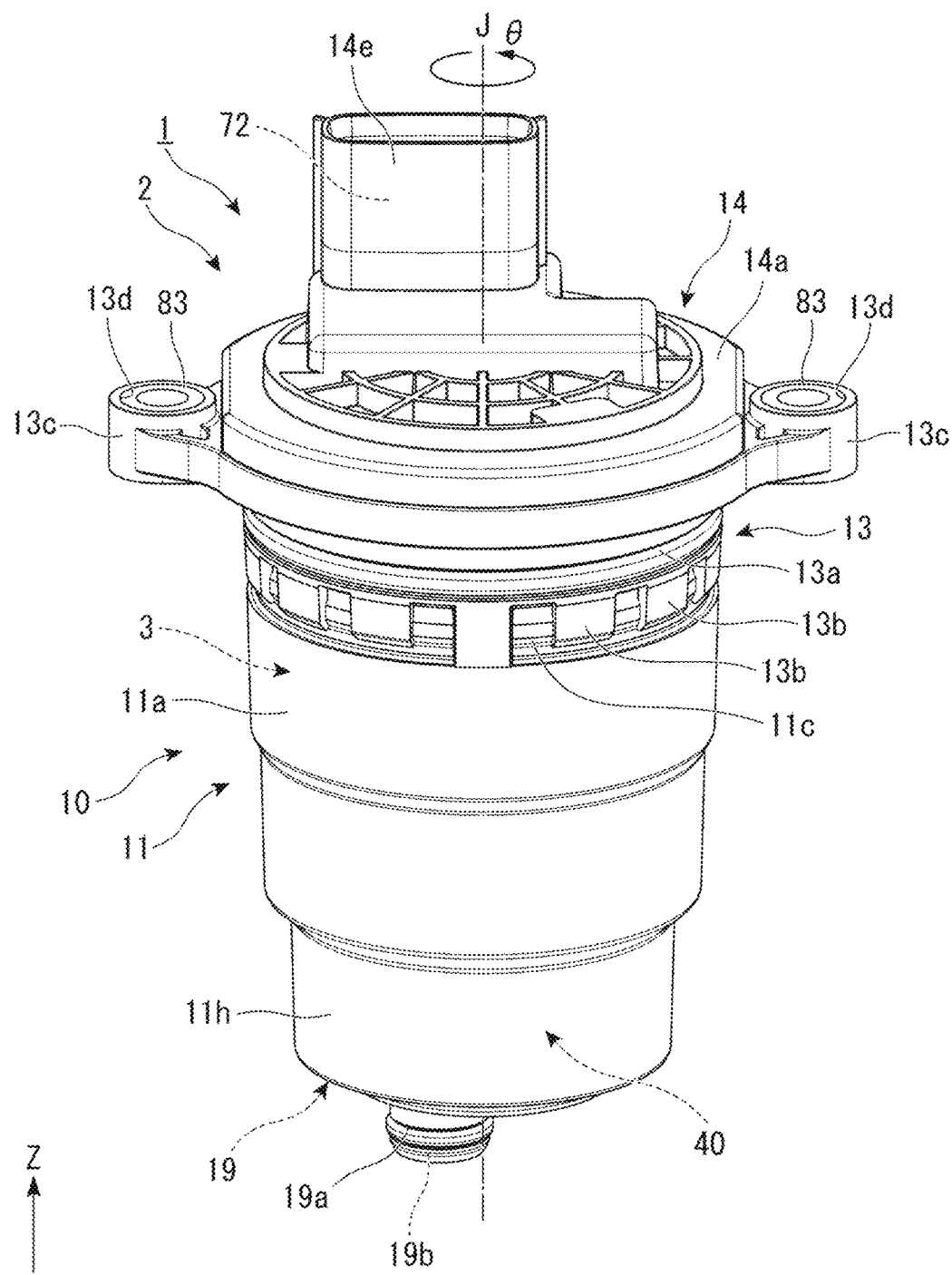
FIG. 1 is a perspective view illustrating a pump of an example embodiment of the present disclosure.
Figure 2:
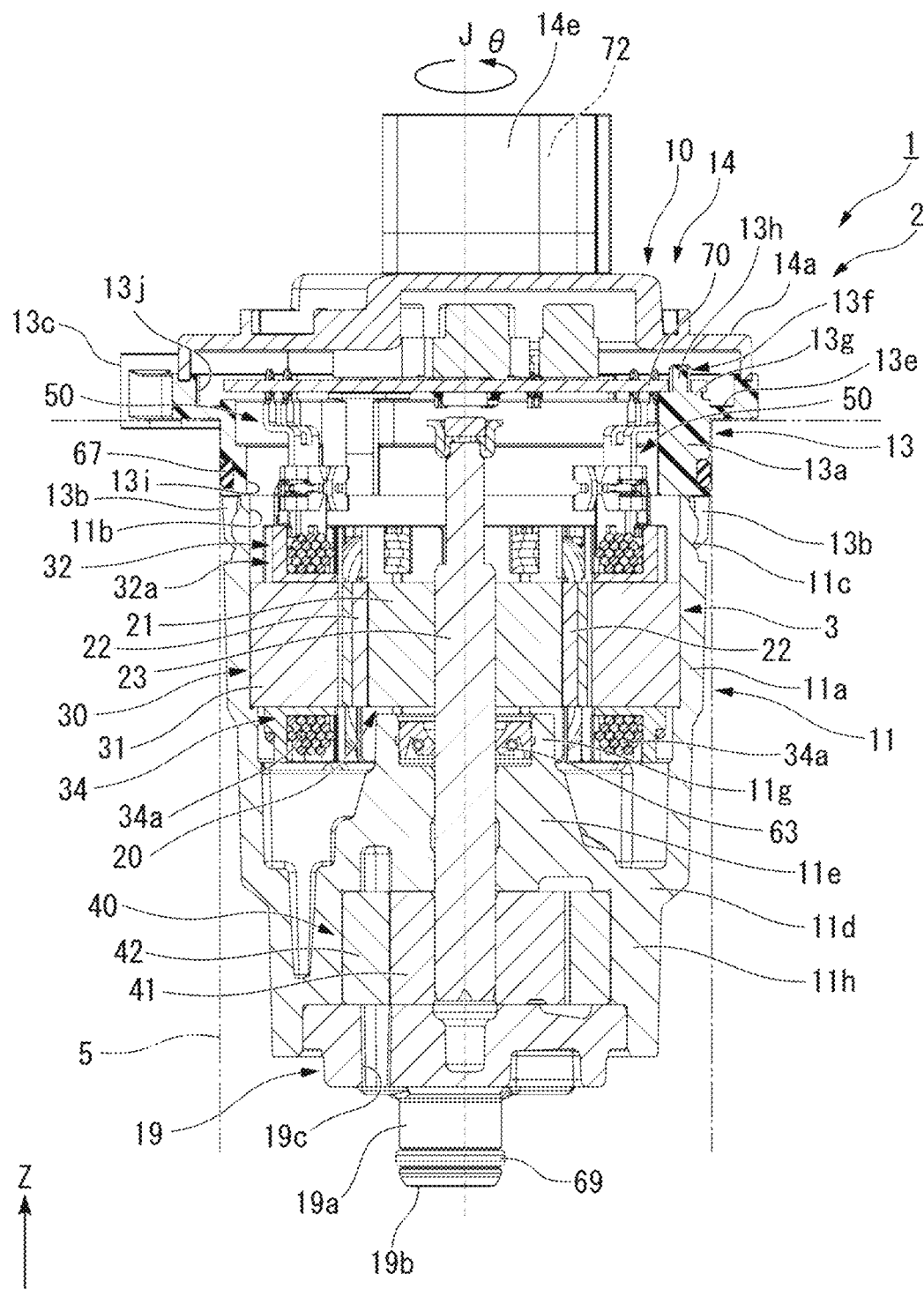
FIG. 2 is a sectional view illustrating a pump of an example embodiment of the present disclosure.

FIG. 1 illustrates a pump 1 of the present example embodiment that is an electric pump attached to equipment mounted on a vehicle. The equipment equipped with the pump 1 may be an automatic transmission or a drive device that drives an axle of the vehicle. The equipment equipped with the pump 1 as illustrated in FIG. 2 is referred to as an attached body 5. The pump 1 is an electric oil pump that supplies oil to the equipment mounted on the vehicle, for example.

The pump 1 includes a motor 2 and a pump mechanism 40. The motor 2 includes a housing 10, a motor assembly 3, a circuit board 70, a connection terminal 50, and a sealing member 63.

The housing 10 internally accommodates the motor assembly 3, the circuit board 70, the connection terminal 50, the sealing member 63, and the pump mechanism 40. The housing 10 includes a motor housing 11, a board accommodating member 13, a lid member 14, and a pump cover member 19. The motor housing 11, the board accommodating member 13, the lid member 14, and the pump cover member 19 are separate from each other. The board accommodating member 13 is fixed to the motor housing 11 on the upper side. The lid member 14 is fixed to the board accommodating member 13 on the upper side. The pump cover member 19 is fixed to the motor housing 11 on the lower side.

The motor housing 11 has a substantially cylindrical shape extending in the axial direction with the central axis J as the center. The motor housing 11 internally accommodates the motor assembly 3, the connection terminal 50, the sealing member 63, and the pump mechanism 40. The motor housing 11 includes a peripheral wall portion 11a, a bottom part 11d, a shaft support 11e, a sealing member holder 11g, and a pump mechanism container 11h.

The peripheral wall portion 11a surrounds the motor assembly 3, the connection terminal 50, and the sealing member 63 from the outside in the radial direction. The peripheral wall portion 11a has a cylindrical shape extending in the axial direction with the central axis J as the center. The peripheral wall portion 11a has an upper end portion serving as an upper end portion of the motor housing 11. The peripheral wall portion 11a includes a first opening 11b that is open upward and a fixing recess 11c. The fixing recess 11c is a groove recessed radially inward from an outer peripheral surface of the peripheral wall portion 11a. The fixing recess 11c is provided in an upper part of the peripheral wall portion 11a. The fixing recess 11c according to the present example embodiment is provided throughout a circumference along the outer peripheral surface of the peripheral wall portion 11a.

The bottom part 11d has a substantially annular shape about the central axis J. The bottom part 11d has a surface facing the upper side and having a radially outer edge that is connected to a lower end of the peripheral wall portion 11a in the axial direction. The shaft support 11e has a substantially cylindrical shape about the central axis J. The shaft support 11e has an outer peripheral surface with a lower part connected to an inner peripheral surface of the bottom part 11d in the radial direction. The shaft support 11e is open upward and downward. The sealing member holder 11g protrudes upward from a surface of the shaft support 11e, the surface facing the upper side. The sealing member holder 11g has a substantially cylindrical shape about the central axis J. The sealing member holder 11g has an inner peripheral surface on which the sealing member 63 is held.

The pump mechanism container 11h internally accommodates the pump mechanism 40. The pump mechanism container 11h protrudes downward from the bottom part 11d. The pump mechanism container 11h has a substantially cylindrical shape about the central axis J and is open downward. The inside of the pump mechanism container 11h communicates with the inside of the peripheral wall portion 11a through the inside of the shaft support 11e.

The pump cover member 19 has a substantially disk shape about the central axis J. The pump cover member 19 is disposed on the lower side from the pump mechanism 40. The pump cover member 19 is fixed to a lower part of an inner peripheral surface of the pump mechanism container 11h. The pump cover member 19 closes the opening of the pump mechanism container 11h from the lower side. The pump cover member 19 includes a suction part 19a, a suction port 19b, and a discharge port 19c.

The suction part 19a has a columnar shape protruding downward from the pump cover member 19. The suction part 19a has an outer peripheral surface with a groove into which an O-ring 69 is fitted. The suction port 19b is a hole axially passing through the pump cover member 19 and the suction part 19a. The discharge port 19c is a hole axially passing through the pump cover member 19. Each of the suction port 19b and the discharge port 19c connects the inside of the pump mechanism container 11h to the outside of the pump 1. In the present example embodiment, the oil is sucked into the pump mechanism container 11h through the suction port 19b, and the oil is discharged to the outside of the pump 1 through the discharge port 19c.

The board accommodating member 13 internally accommodates the circuit board 70. The board accommodating member 13 holds the circuit board 70. The board accommodating member 13 is fixed to the upper end of the motor housing 11. The board accommodating member 13 has a substantially annular shape about the central axis J. The board accommodating member 13 according to the present example embodiment is made of resin. The board accommodating member 13 includes a board container 13a, a board holder 13f, a fixing claw part 13b, and a flange part 13c.

The board container 13a has a substantially annular shape about the central axis J. The board container 13a surrounds the circuit board 70 from the outside in the radial direction. The board container 13a includes a second opening 13i that is open downward and a third opening 13j that is open upward. The inside of the motor housing 11 communicates with the inside of the board accommodating member 13 through the first opening 11b and the second opening 13i. The board container 13a has an inner surface provided with a step including a step surface 13e facing upward. The board container 13a has an outer peripheral surface with a groove into which an O-ring 67 is fitted.

Figure 3:
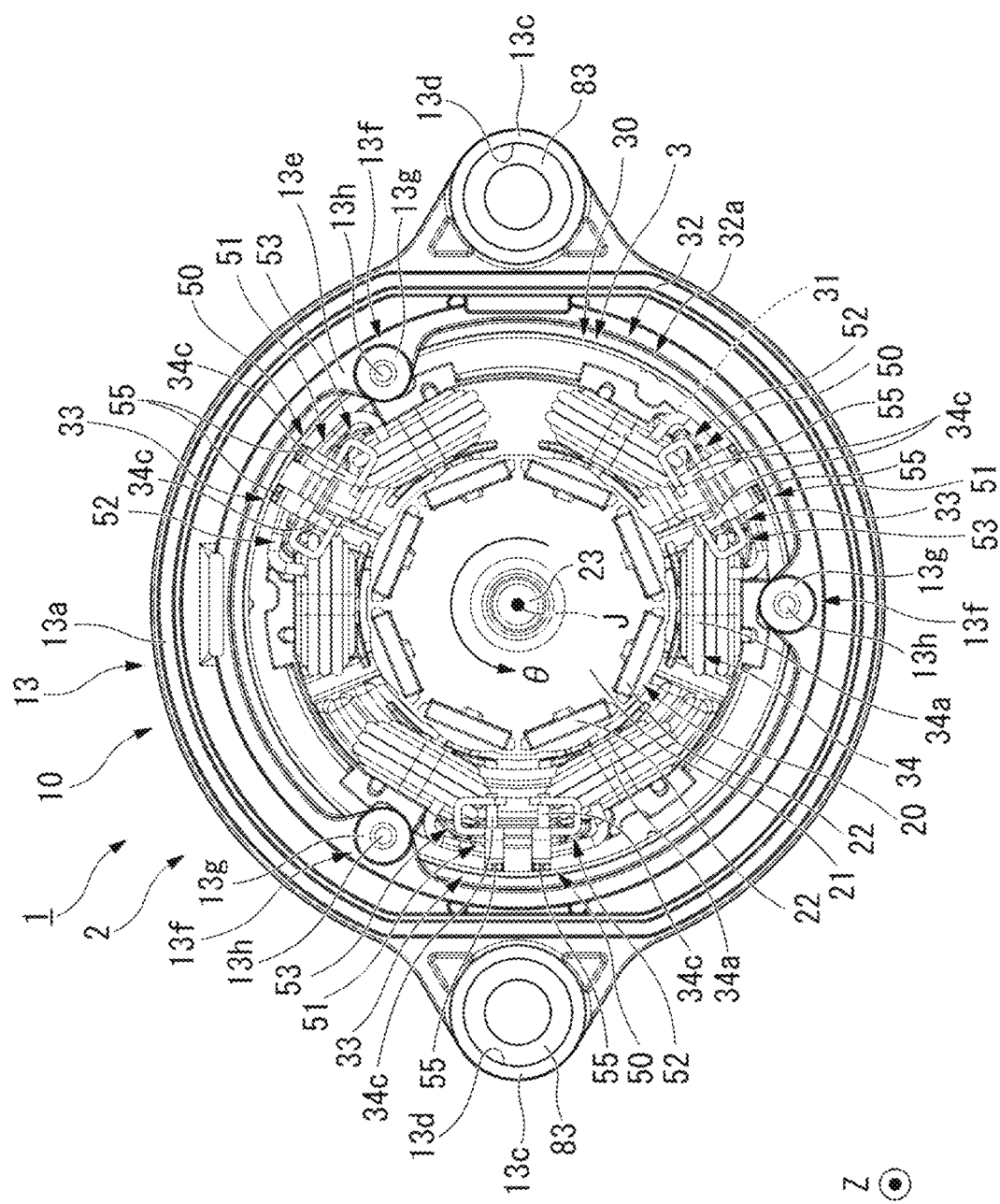
FIG. 3 is a top view illustrating a portion of a pump of an example embodiment of the present disclosure.

The board holder 13f holds the circuit board 70. The board holder 13f protrudes upward from the step surface 13e. As illustrated in FIG. 3, the board accommodating member 13 according to the present example embodiment includes a plurality of board holders 13f. The board accommodating member 13 according to the present example embodiment includes three board holders 13f. The board holders 13f are disposed at substantially equal intervals along the circumferential direction. Each board holder 13f includes a support 13g and an insertion part 13h. As illustrated in FIG. 2, the support 13g has a disk shape protruding upward from the step surface 13e. The support 13g has a plate surface facing the axial direction. The insertion part 13h has a columnar shape protruding upward from the support 13g. As illustrated in FIG. 3, the insertion part 13h has a smaller outer diameter than the support 13g.

Figure 4:
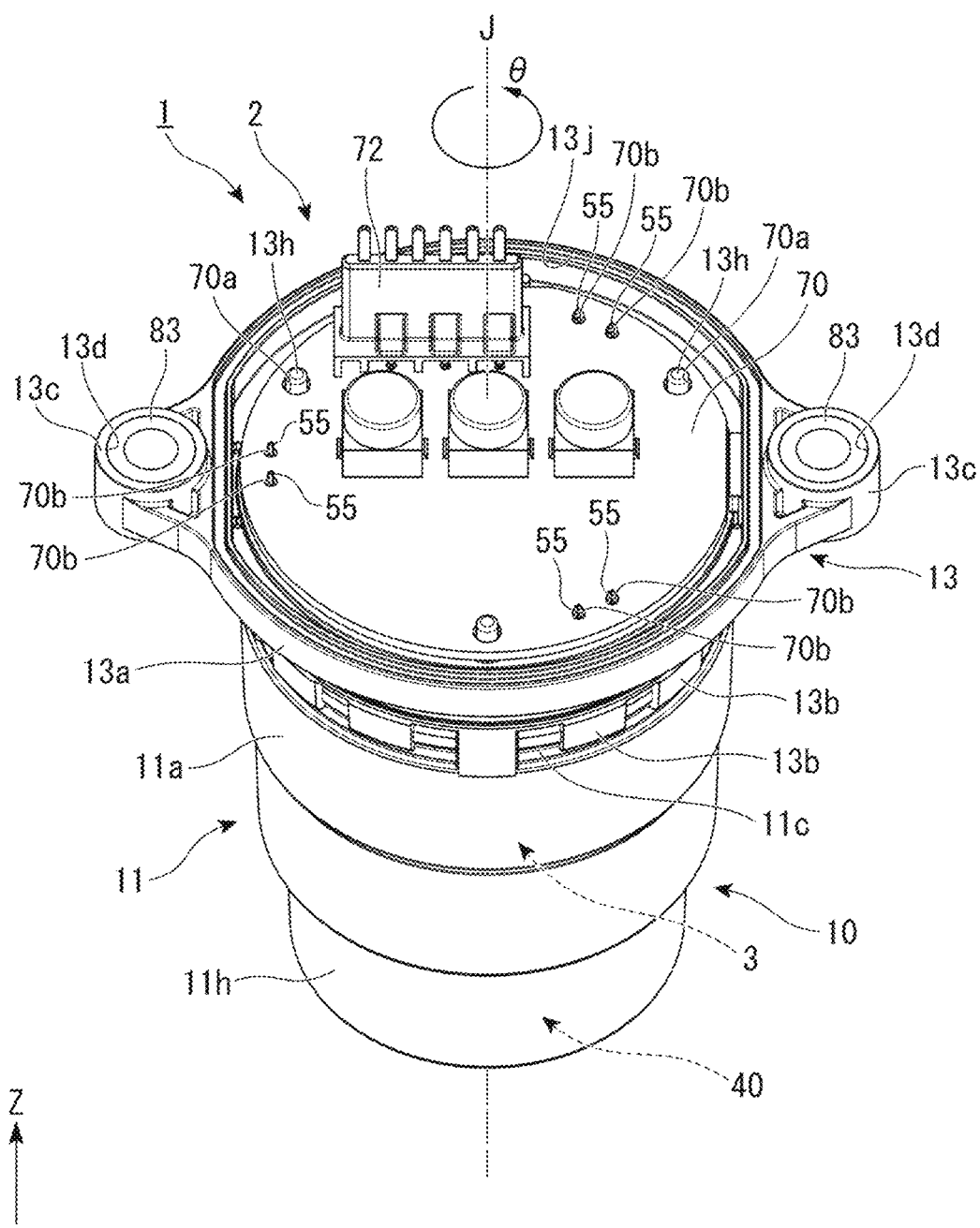
FIG. 4 is a first perspective view illustrating a portion of a pump of an example embodiment of the present disclosure.

As illustrated in FIG. 2, the fixing claw part 13b protrudes downward from the board container 13a. The fixing claw part 13b is disposed radially outside the peripheral wall portion 11a. The fixing claw part 13b has a leading end protruding radially inward. The board accommodating member 13 according to the present example embodiment includes a plurality of fixing claw parts 13b. Although not illustrated, the board accommodating member 13 according to the present example embodiment includes fourteen fixing claw parts 13b. As illustrated in FIG. 4, the fixing claw parts 13b are disposed at intervals in the circumferential direction. As illustrated in FIG. 2, each fixing claw part 13b has the leading end located inside the fixing recess 11c of the motor housing 11. Each fixing claw part 13b is elastically deformable radially inward, so that the leading end of each fixing claw part 13b can be prevented from being detached from the inside of the fixing recess 11c. The board accommodating member 13 is accordingly fixed to the motor housing 11.

As illustrated in FIG. 4, the flange part 13c protrudes radially outward from the board container 13a. When viewed in the axial direction, the flange part 13c has a substantially triangular shape in which one corner protrudes radially outward. The flange part 13c includes a flange hole 13d axially passing through the flange part 13c. The flange hole 13d allows a collar member 83 in a cylindrical shape extending in the axial direction to be fixed to the flange hole 13d. The board accommodating member 13 according to the present example embodiment includes a plurality of flange parts 13c. The board accommodating member 13 according to the present example embodiment includes two flange parts 13c. The flange parts 13c are provided at positions radially opposed to each other. Into the collar member 83, a bolt (not illustrated) is inserted from the upper side, and when the bolt is tightened into a screw hole (not illustrated) provided in the attached body 5 illustrated in FIG. 2, each flange part 13c is fixed to the attached body 5. The motor 2 and the pump 1 are accordingly fixed to the attached body 5.

The lid member 14 includes a lid part 14a and a connector container 14e. The lid part 14a has a substantially cylindrical shape protruding in the axial direction with the central axis J as the center. The lid part 14a is open downward. The lid part 14a is fixed to an upper end of the board accommodating member 13. The lid member 14 is accordingly fixed to the board accommodating member 13. The lid part 14a closes the third opening 13j from the upper side.

As illustrated in FIG. 1, the connector container 14e protrudes upward from the lid part 14a. The connector container 14e has a substantially rectangular tubular shape that is open toward both the upper side and the lower side. The inside of the connector container 14e communicates with the inside of the lid member 14 through a hole (not illustrated) passing through the lid part 14a in the axial direction.

As illustrated in FIG. 2, the motor assembly 3 is accommodated inside the motor housing 11. In the axial direction, the motor assembly 3 is disposed below the circuit board 70 and above the pump mechanism 40. The motor assembly 3 includes a rotor 20 and a stator 30.

The rotor 20 is rotatable about the central axis J. The rotor 20 includes a rotor core 21, a magnet 22, and a shaft 23. The magnet 22 and the shaft 23 are fixed to the rotor core 21. The rotor 20 is rotatably supported about the central axis J by an inner peripheral surface of a shaft support 11e that supports the shaft 23. The shaft 23 has a columnar shape extending in the axial direction with the central axis J as the center. The shaft 23 is inserted through the inside of the shaft support 11e in the axial direction to be disposed across the inside of the peripheral wall portion 11a and the inside of the pump mechanism container 11h.

The stator 30 is disposed radially outside of the rotor 20. The stator 30 faces the rotor 20 in the radial direction with a gap interposed therebetween. The stator 30 includes a stator core 31, an insulating portion 32, and a coil portion 34.

The stator core 31 has an annular shape surrounding the rotor core 21 from the outside in the radial direction. The stator core 31 has an outer peripheral surface fixed to the peripheral wall portion 11a of the motor housing 11. The stator core 31 according to the present example embodiment is press-fitted into the peripheral wall portion 11a. The stator core 31 may be fixed to the peripheral wall portion 11a by another method such as adhesion.

Figure 5:
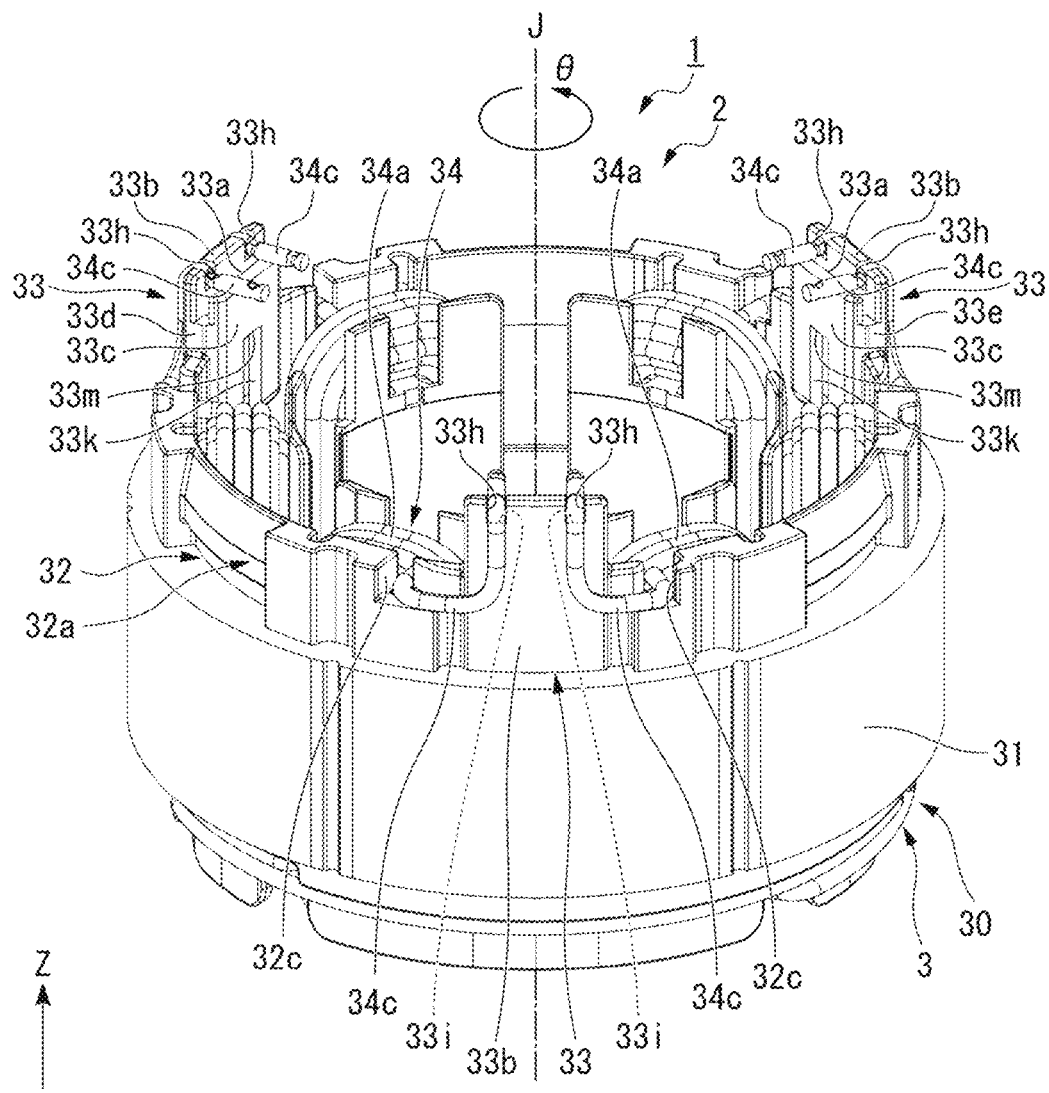
FIG. 5 is a second perspective view illustrating a portion of a pump of an example embodiment of the present disclosure.

The insulating portion 32 is attached to the stator core 31. The insulating portion 32 is disposed between the stator core 31 and the coil portion 34. The insulating portion 32 insulates the stator core 31 from the coil portion 34. The insulating portion 32 includes an annular wall portion 32a protruding upward. The annular wall portion 32a is disposed between the stator core 31 and the circuit board 70 in the axial direction. The annular wall portion 32a has a substantially annular shape about the central axis J. The annular wall portion 32a faces the peripheral wall portion 11a in the radial direction with a gap interposed therebetween. As illustrated in FIG. 5, the annular wall portion 32a includes an insertion recess 32c and a terminal holder 33.

The insertion recess 32c is a hole recessed downward from an upper end of the annular wall portion 32a. The insertion recess 32c is open toward both sides in the radial direction. When viewed in the radial direction, the insertion recess 32c has a substantially rectangular shape. The annular wall portion 32a according to the present example embodiment includes a plurality of insertion recesses 32c. Although not illustrated, the annular wall portion 32a according to the present example embodiment includes six insertion recesses 32c. The insertion recesses 32c are provided at intervals along the circumferential direction. The insertion recesses 32c according to the present example embodiment are disposed along the circumferential direction at substantially equal intervals for each of a pair of insertion recesses 32c. Two insertion recesses 32c constituting the pair of insertion recesses 32c are disposed at an interval along the circumferential direction.

The terminal holder 33 has a substantially rectangular parallelepiped shape protruding in the axial direction. The shape of the terminal holder 33 is not limited to a substantially rectangular parallelepiped shape, and may be another shape such as a columnar shape extending in the axial direction, for example. The terminal holder 33 has two outer surfaces facing radially. When viewed in the radial direction, the terminal holder 33 has a substantially rectangular shape with a long side extends in the axial direction. The insulating portion 32 according to the present example embodiment includes a plurality of terminal holders 33. The insulating portion 32 according to the present example embodiment includes three terminal holders 33. The terminal holders 33 are disposed at substantially equal intervals along the circumferential direction. Each terminal holder 33 includes a hole 33a. Each terminal holder 33 includes a wall portion 33b, a first part 33c, a second part 33d, and a third part 33e.

The hole 33a is recessed from the upper side of the terminal holder 33, or recessed from an end portion of the terminal holder 33 on the first side (+Z side) in the axial direction toward the lower side, or toward the second side (−Z side) in the axial direction. When viewed in the axial direction, the hole 33a has a substantially rectangular shape with a long side extending in the circumferential direction. The wall portion 33b is a part of the terminal holder 33, the part being located radially outside the hole 33a. The wall portion 33b has a plate shape extending in the axial direction. The wall portion 33b has a plate surface facing the radial direction. When viewed in the radial direction, the wall portion 33b has a substantially rectangular shape. The wall portion 33b includes a recess 33h and a lead wire contact portion 33i that is a surface facing upward among inner surfaces of the recess 33h.

The recess 33h is a hole recessed from the upper side of the wall portion 33b, or recessed from an end portion of the wall portion 33b on the first side (+Z side) in the axial direction toward the lower side, or toward the second side in the axial direction. The recess 33h is open along the radial direction. The wall portion 33b according to the present example embodiment includes two recesses 33h. The recesses 33h are disposed at an interval in the circumferential direction. One of the recesses 33h is provided in a part of the wall portion 33b, the part being located on the first side (+θ side) in the circumferential direction. The other of the recesses 33h is provided in a part of the wall portion 33b, the part being located on the second side (−θ side) in the circumferential direction. The lead wire contact portion 33i is a surface among inner surfaces of the recess 33h, the surface facing upward, or toward the first side in the axial direction. The lead wire contact portion 33i according to the present example embodiment has a planar shape. The lead wire contact portion 33i may have a curved surface shape or may be an inclined surface inclined in the circumferential direction or the radial direction.

Figure 6:
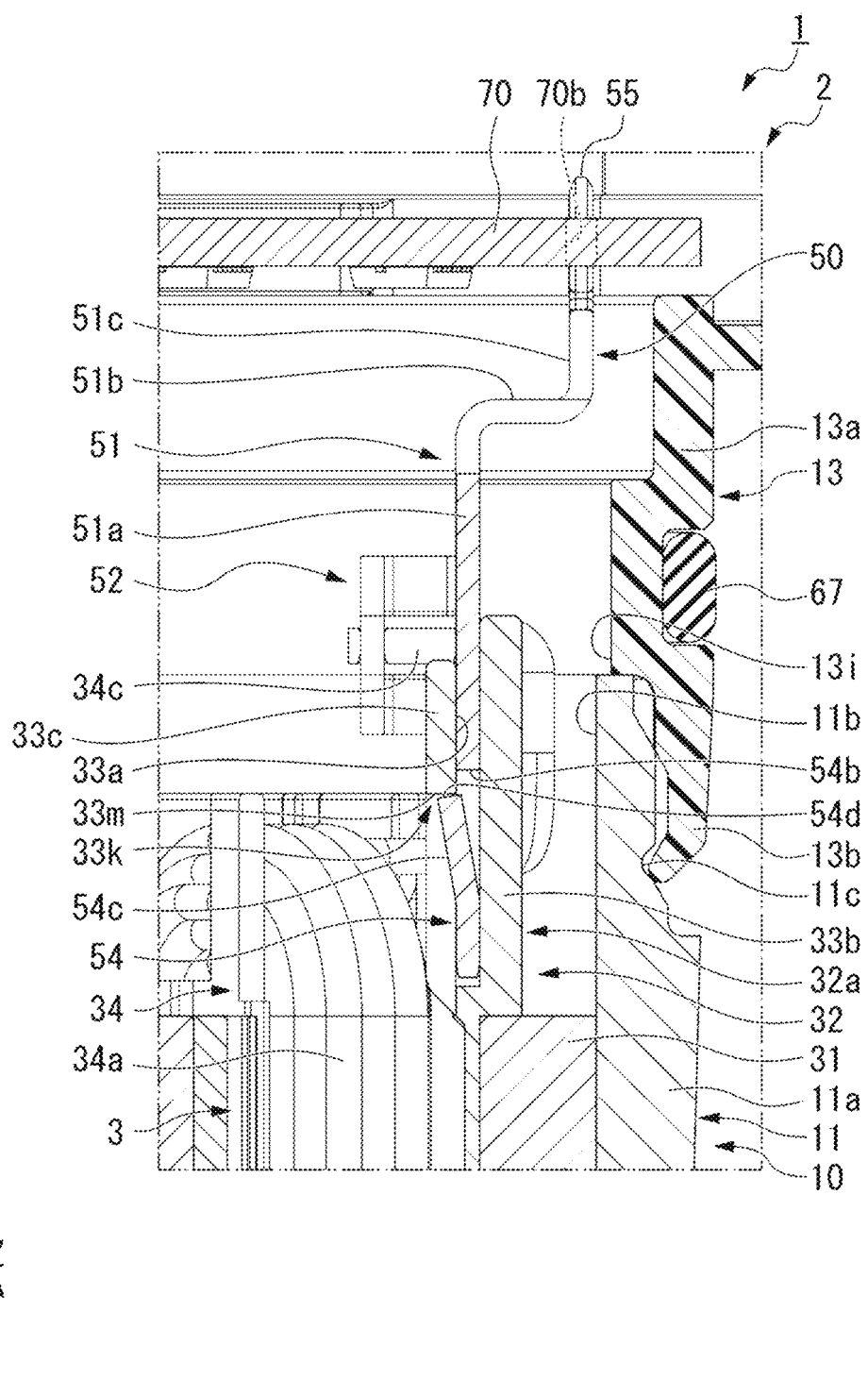
FIG. 6 is a sectional view illustrating a portion of a pump of an example embodiment of the present disclosure.
Figure 7:
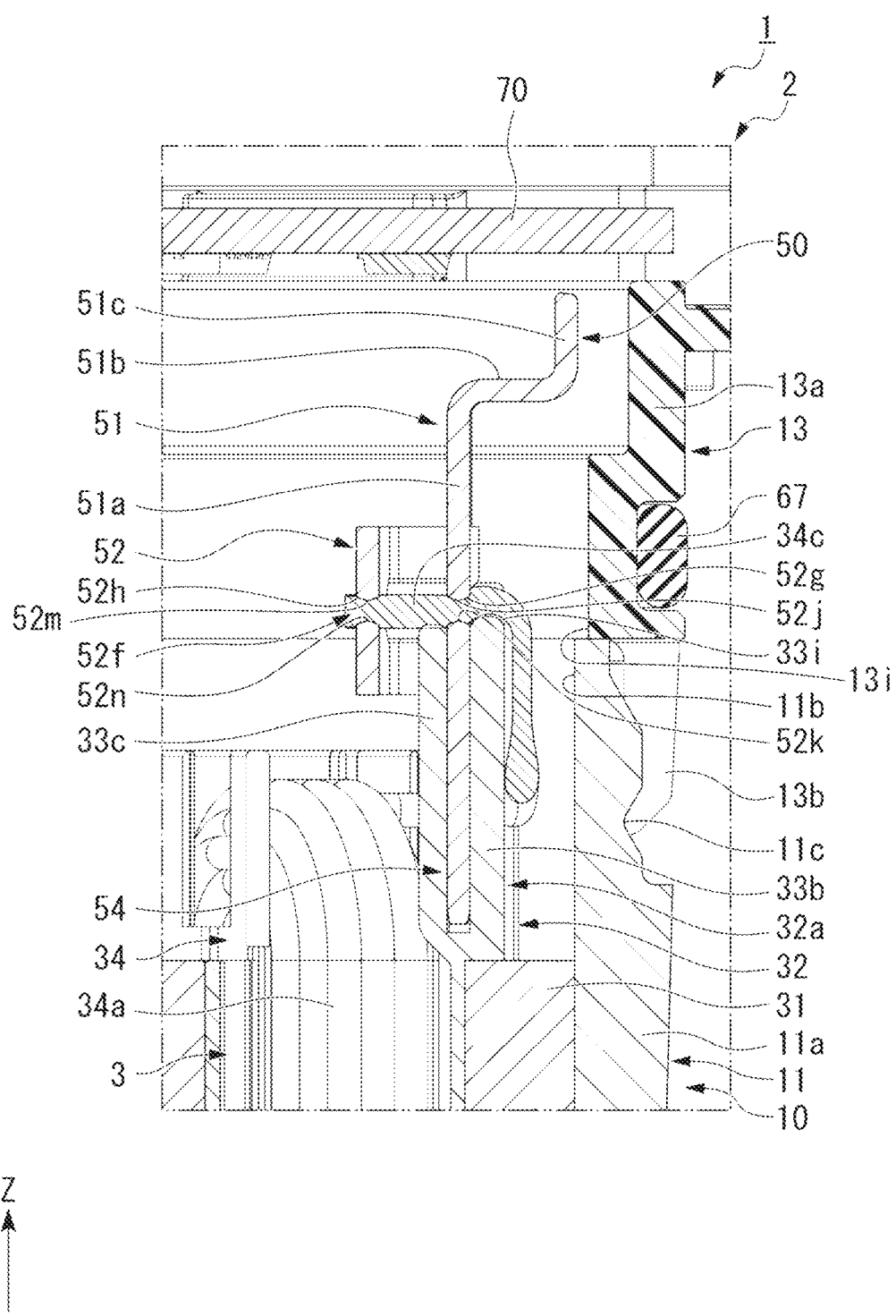
FIG. 7 is a sectional view illustrating another portion of a pump of an example embodiment of the present disclosure.

The first part 33c is a part of the terminal holder 33, the part being located radially inside the hole 33a. The first part 33c has a plate shape extending in the axial direction. When viewed in the radial direction, the first part 33c has a substantially rectangular shape. As illustrated in FIG. 6, the first part 33c has an upper located below an upper end of the wall portion 33b in the axial direction. As illustrated in FIG. 7, the upper end of the first part 33c is located below the lead wire contact portion 33i in the axial direction. As illustrated in FIG. 5, the first part 33c includes a through-hole 33k. The through-hole 33k passes through the first part 33c in the radial direction. When viewed in the radial direction, the through-hole 33k has a substantially rectangular shape with a long side extending in the axial direction. The through-hole 33k internally communicates with the inside of the hole 33a. The through-hole 33k has a surface facing downward among inner surfaces, the surface serving as a support surface 33m. That is, the insulating portion 32 has the support surface 33m facing the lower side, or the second side (−Z side) in the axial direction.

The second part 33d is a part of the terminal holder 33, the part being located on the first side (+θ side) in the circumferential direction from the hole 33a. The third part 33e is a part of the terminal holder 33, the part being located on the second side (−θ side) in the circumferential direction from the hole 33a. Each of the second part 33d and the third part 33e has a plate shape extending in a direction orthogonal to the circumferential direction. When viewed in the circumferential direction, each of the second part 33d and the third part 33e has a substantially rectangular shape. The second part 33d is connected to an edge part of each of the wall portion 33b and the first part 33c, the edge part being located on the first side in the circumferential direction. The third part 33e is connected to an edge part of each of the wall portion 33b and the first part 33c, the edge part being located on the second side in the circumferential direction. Each of the second part 33d and the third part 33e has an upper end that is located below an upper end of the first part 33c in the axial direction.

As illustrated in FIG. 2, the coil portion 34 is electrically connected to the circuit board 70 with the connection terminal 50. The circuit board 70 supplies electric power to the coil portion 34 through the connection terminal 50. As illustrated in FIG. 5, the coil portion 34 includes a plurality of coil bodies 34a and a coil lead wire 34c.

The plurality of coil bodies 34a is attached to the stator core 31 with the insulating portion 32 interposed therebetween. The plurality of coil bodies 34a is disposed radially inside the annular wall portion 32a. The coil portion 34 according to the present example embodiment includes six coil bodies 34a. The coil bodies 34a are disposed at intervals along the circumferential direction.

Figure 8:
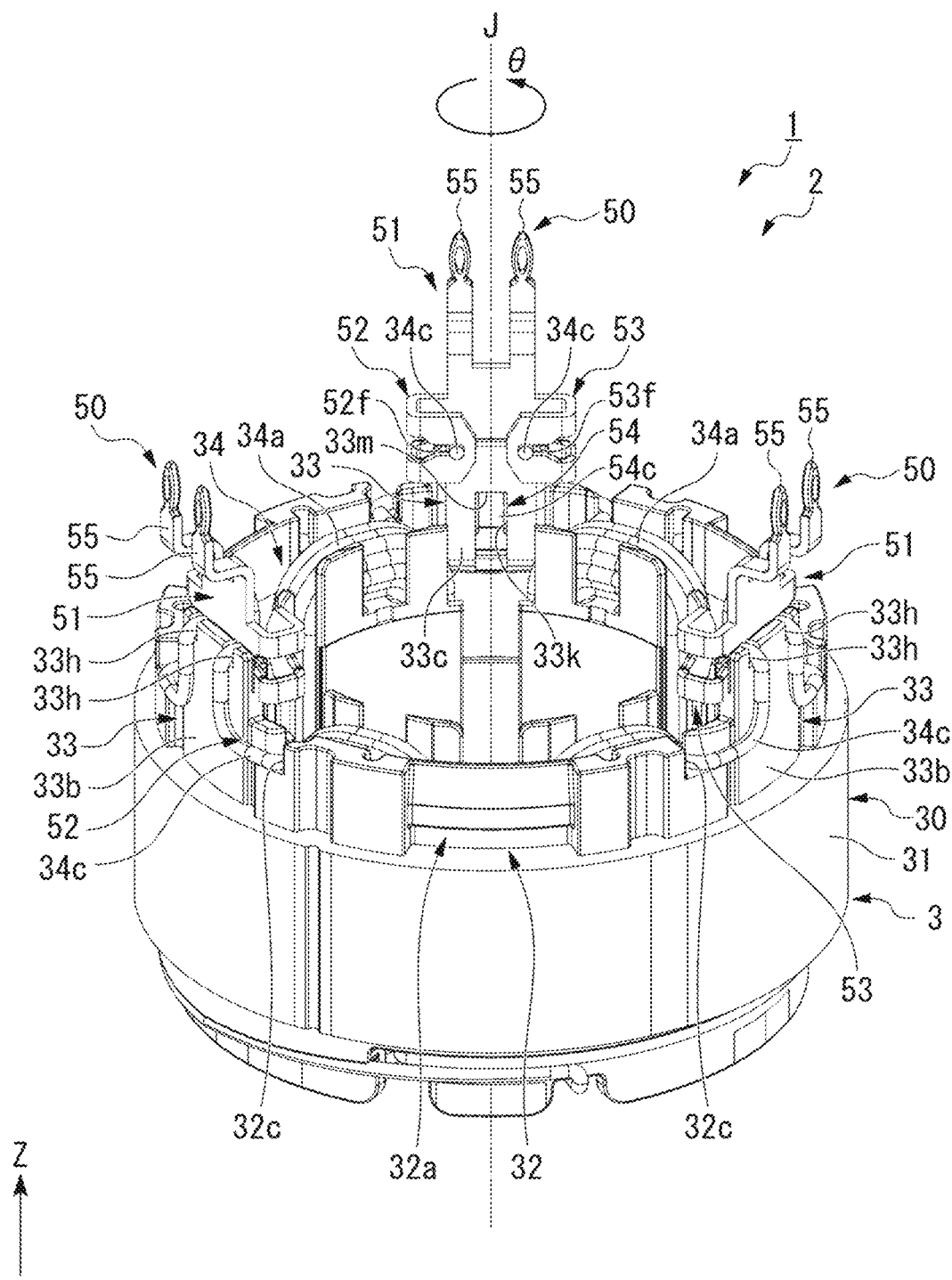
FIG. 8 is a third perspective view illustrating a portion of a pump of an example embodiment of the present disclosure.

As illustrated in FIG. 8, the coil lead wire 34c is connected to the connection terminal 50. The coil lead wire 34c is drawn out from the coil body 34a. The coil portion 34 according to the present example embodiment includes six coil lead wires 34c. Each of the coil lead wires 34c is drawn out from a corresponding one of the coil bodies 34a. Each of the coil lead wires 34c is drawn out from the coil body 34a toward the outside of the annular wall portion 32a in the radial direction through a corresponding one of the insertion recesses 32c. A path in which each coil lead wire 34c is disposed, a connection configuration between each coil lead wire 34c and connection terminal 50, and the like will be described in detail later.

As illustrated in FIG. 2, the sealing member 63 is held on an inner peripheral surface of the sealing member holder 11g. The sealing member 63 is disposed below the rotor core 21. The sealing member 63 according to the present example embodiment is a lip seal having a lip part radially inside. The lip part of the sealing member 63 is in contact with an outer peripheral surface of the shaft 23. Thus, the sealing member 63 seals between the shaft 23 and the motor housing 11.

The pump mechanism 40 is accommodated in the pump mechanism container 11h. The pump mechanism 40 includes an inner rotor 41 and an outer rotor 42. The inner rotor 41 is connected to a part of the shaft 23, the part protruding into the pump mechanism container 11h. Thus, the pump mechanism 40 is connected to the rotor 20. The inner rotor 41 has an annular shape surrounding the shaft 23. The outer rotor 42 has an annular shape surrounding the inner rotor 41. The inner rotor 41 and the outer rotor 42 mesh with each other. As a result, when the rotor 20 rotates about the central axis J, the inner rotor 41 and the outer rotor 42 also rotate about the central axis J.

The circuit board 70 is electrically connected to the coil portion 34 with the connection terminal 50. The circuit board 70 controls electric power to be supplied to the coil portion 34. As described above, the circuit board 70 is accommodated inside the board container 13a. The circuit board 70 is disposed above the motor assembly 3, or on the first side (+Z side) in the axial direction from the motor assembly 3. The circuit board 70 has a plate shape extending in a direction orthogonal to the axial direction. As illustrated in FIG. 4, the circuit board 70 has a substantially circular shape when viewed in the axial direction. The circuit board 70 includes a plurality of first through-holes 70a and a plurality of second through-holes 70b. A connector member 72 is attached to the circuit board 70.

Each of the plurality of first through-holes 70a passes through the circuit board 70 in the axial direction. Three first through-holes 70a are provided in the present example embodiment. The first through-holes 70a are disposed at substantially equal intervals along the circumferential direction. The insertion part 13h of the board holder 13f is inserted through each of the first through-holes 70a in the axial direction. The insertion part 13h according to the present example embodiment is fitted into each of the first through-holes 70a. As a result, a circumferential position and a radial position of the circuit board 70 with respect to the board accommodating member 13 are determined. As illustrated in FIG. 2, the circuit board 70 has a surface facing downward, the surface being supported in the axial direction by the support 13g of the board holder 13f. As a result, an axial position of the circuit board 70 with respect to the board accommodating member 13 is determined. Thus, the circuit board 70 is held by the board accommodating member 13.

As illustrated in FIG. 4, the plurality of second through-holes 70b passes through the circuit board 70 in the axial direction. The second through-hole 70b is a through hole, for example. The second through-hole 70b has an inner surface provided with conductive copper foil. Six second through-holes 70b are provided in the present example embodiment. The second through-holes 70b according to the present example embodiment are disposed along the circumferential direction at substantially equal intervals for each of a pair of second through-holes 70b. Two second through-holes 70b constituting the pair of second through-holes 70b are disposed at an interval in the circumferential direction.

The connector member 72 electrically connects the circuit board 70 to an external device (not illustrated) that supplies electric power to the motor 2. The connector member 72 is attached to a surface of the circuit board 70, the surface facing upward, and protrudes upward. The connector member 72 includes an upper part disposed inside the connector container 14e illustrated in FIG. 2.

Figure 9:
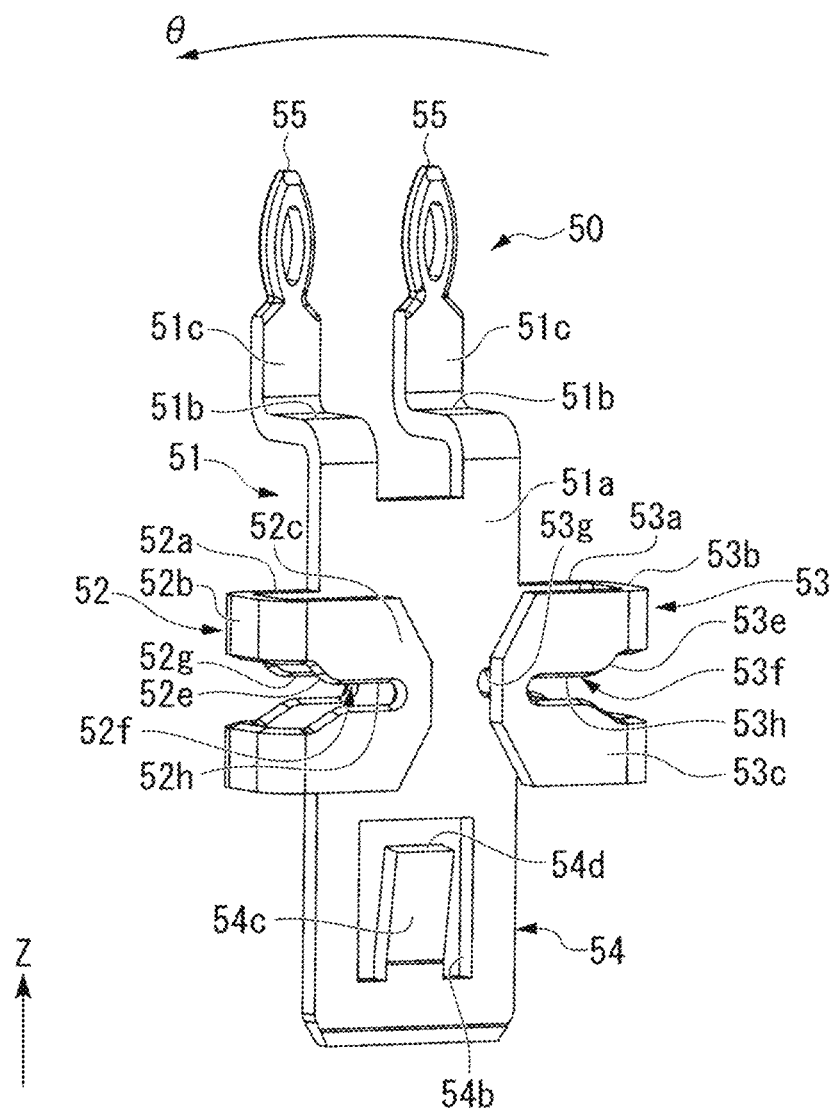
FIG. 9 is a perspective view illustrating a connection terminal of an example embodiment of the present disclosure.

The connection terminal 50 electrically connects the coil lead wire 34c to the circuit board 70. That is, the connection terminal 50 electrically connects the circuit board 70 to the stator 30. The connection terminal 50 is disposed between the stator core 31 and the circuit board 70 in the axial direction. As illustrated in FIG. 8, the connection terminal 50 is held by the terminal holder 33 of the insulating portion 32. The motor 2 according to the present example embodiment includes a plurality of connection terminals 50. The motor 2 according to the present example embodiment includes three connection terminals 50. The connection terminals 50 are disposed at substantially equal intervals along the circumferential direction. The connection terminal 50 has conductivity. The connection terminal 50 according to the present example embodiment is made of metal. As illustrated in FIG. 9, the connection terminal 50 includes a terminal body 51, two arm portions 52 and 53, a leg portion 54, and a board connector 55.

The terminal body 51 extends in the axial direction. The terminal body 51 has a lower end that is at a substantially identical position to a lower end of the arm portion 52 in the axial direction. The terminal body 51 includes a first terminal body 51a, a second terminal body 51b, and a third terminal body 51c. The first terminal body 51a has a plate shape extending in the axial direction. The first terminal body 51a has a plate surface facing the radial direction. When viewed in the radial direction, the first terminal body 51a has a substantially rectangular shape. The first terminal body 51a has a lower end serving as a lower end of the terminal body 51.

The second terminal body 51b has a plate shape extending radially outward from an upper end of the first terminal body 51a. The second terminal body 51b has a plate surface facing the axial direction. When viewed in the axial direction, the second terminal body 51b has a substantially rectangular shape. The terminal body 51 according to the present example embodiment includes two second terminal bodies 51b. One of the second terminal bodies 51b is connected to a part of the upper end of the first terminal body 51a, the part being located on the first side (+θ side) in the circumferential direction. The other of the second terminal bodies 51b is connected to a part of the upper end of the first terminal body 51a, the part being located on the second side (−θ side) in the circumferential direction. The second terminal bodies 51b are disposed at an interval in the circumferential direction.

The third terminal body 51c has a plate shape protruding upward from a radially outer end portion of the second terminal body 51b. The third terminal body 51c has a plate surface facing the radial direction. When viewed in the radial direction, the third terminal body 51c has a substantially rectangular shape. The third terminal body 51c has an upper end serving as upper end of the terminal body 51. The terminal body 51 according to the present example embodiment includes two third terminal bodies 51c. One of the third terminal bodies 51c is connected to an upper end of the one of the second terminal bodies 51b. The other of the third terminal bodies 51c is connected to an upper end of the other of the second terminal bodies 51b. The third terminal bodies 51c are disposed at an interval in the circumferential direction.

Each of the two arm portions 52 and 53 has a plate shape protruding from the terminal body 51 in a direction intersecting the axial direction. Each of the arm portions 52 and 53 according to the present example embodiment has a plate shape protruding in the circumferential direction from the first terminal body 51a. The one arm portion 52 protrudes from the first terminal body 51a toward the first side (+θ side) in the circumferential direction. The other arm portion 53 protrudes from the first terminal body 51a toward the second side (−θ side) in the circumferential direction. Each of the arm portions 52 and 53 according to the present example embodiment has a plate surface facing a direction orthogonal to the axial direction. When viewed in the axial direction, each of the arm portions 52 and 53 has a substantially U shape. The shapes of the arm portions 52 and 53 are plane-symmetrical with each other with a virtual plane as a symmetry plane, the virtual plane being orthogonal to the circumferential direction and passing through a circumferential center of the connection terminal 50. As illustrated in FIG. 8, each of the arm portions 52 and 53 is connected to a corresponding one of the coil lead wires 34c.

As illustrated in FIG. 9, the arm portion 52 includes a first arm portion 52a, a second arm portion 52b, and a third arm portion 52c. The arm portion 52 includes an arm recess 52e and a groove 52f. The first arm portion 52a has a plate shape extending from an end portion of the first terminal body 51a, the end portion being on the first side (+θ side) in the circumferential direction, toward the first side in the circumferential direction. The second arm portion 52b has a plate shape extending radially inward from the end portion of the first arm portion 52a, the end portion being on the first side in the circumferential direction. The third arm portion 52c has a plate shape extending from a radially inner end portion of the second arm portion 52b toward the second side (−θ side) in the circumferential direction. When viewed in the radial direction, the third arm portion 52c overlaps the first arm portion 52a.

The arm recess 52e is a hole recessed from an end portion of the arm portion 52, the end portion being on the first side in the circumferential direction, toward the second side in the circumferential direction. More specifically, the arm recess 52e is recessed toward the second side in the circumferential direction from a surface of the second arm portion 52*b*, the surface facing the first side in the circumferential direction, and has an end portion on the second side in the circumferential direction, the end portion being located in a part of each of the first arm portion 52*a* and the third arm portion 52*c*, the part being on the first side in the circumferential direction. The arm recess 52*e* is open toward both the sides in the radial direction. When viewed in the radial direction, the arm recess 52*e* extends from a surface of the second arm portion 52*b*, the surface facing the first side in the circumferential direction, toward the second side in the circumferential direction with a substantially equal axial dimension, and then the axial dimension decreases toward the second side in the circumferential direction.

The groove 52*f* is a hole recessed in a direction intersecting the axial direction from an end portion of the arm recess 52*e*, the end portion being on the second side in the circumferential direction. The groove 52*f* according to the present example embodiment is a hole recessed from the end portion of the arm recess 52*e*, the end portion being on the second side in the circumferential direction, toward the second side in the circumferential direction. The groove 52*f* is open toward both the sides in the radial direction. When viewed in the radial direction, the groove 52*f* has a substantially rectangular shape with a long side extending in the circumferential direction. As illustrated in FIG. 8, the groove 52*f* overlaps the wall portion 33*b* in the radial direction. The coil lead wire 34*c* is inserted through the groove 52*f* along the radial direction. As illustrated in FIG. 9, the groove 52*f* according to the present example embodiment includes a first groove 52*g* and a second groove 52*h*.

The first groove 52*g* is a hole recessed in the first arm portion 52*a*, the hole being recessed from the end portion of the arm recess 52*e*, the end portion being on the second side in the circumferential direction, toward the second side in the circumferential direction. The second groove 52*h* is a hole recessed in the third arm portion 52*c*, the hole being recessed from the end portion of the arm recess 52*e*, the end portion being on the second side in the circumferential direction, toward the second side in the circumferential direction. The first groove 52*g* and the second groove 52*h* are each open toward both the sides in the radial direction. As illustrated in FIG. 7, the first groove 52*g* and the second groove 52*h* overlap each other when viewed in the radial direction. The first groove 52*g* and the second groove 52*h* are disposed side by side in the radial direction. The lead wire contact portion 33*i* is located above each of the first groove 52*g* and the second groove 52*h* in the axial direction, or above a surface of each of them, the surface facing the first side (+Z side) in the axial direction. That is, the lead wire contact portion 33*i* is located above a surface of the groove 52*f*, the surface facing upward. The lead wire contact portion 33*i* is also located below a surface of the groove 52*f*, the surface facing downward. One coil lead wire 34*c* is inserted through the first groove 52*g* and the second groove 52*h* in the radial direction.

When viewed in the circumferential direction, the first groove 52*g* has an inner surface facing downward that inclines downward from both ends in the radial direction toward the center in the radial direction, and a lower end portion provided with a corner part 52*j*. When viewed in the circumferential direction, the corner part 52*j* has a shape pointed downward. When viewed in the circumferential direction, the first groove 52*g* has a surface facing upward that inclines upward from both the ends in the radial direction toward the center in the radial direction, and an upper end portion provided with a corner part 52*k*. When viewed in the circumferential direction, the corner part 52*k* has a shape pointed upward. The corner parts 52*j* and 52*k* face each other in the axial direction.

When viewed in the circumferential direction, the second groove 52*h* has an inner surface facing downward that inclines downward from both ends in the radial direction toward the center in the radial direction, and a lower end portion provided with a corner part 52*m*. When viewed in the circumferential direction, the corner part 52*m* has a shape pointed downward. When viewed in the circumferential direction, the second groove 52*h* has a surface facing upward that inclines upward from both the ends in the radial direction toward the center in the radial direction, and an upper end portion provided with a corner part 52*n*. When viewed in the circumferential direction, the corner part 52*n* has a shape pointed upward. The corner parts 52*m* and 52*n* face each other in the axial direction.

As illustrated in FIG. 9, the arm portion 53 includes a first arm portion 53*a*, a second arm portion 53*b*, and a third arm portion 53*c*. The arm portion 53 includes an arm recess 53*e* and a groove 53*f*. As described above, the arm portion 53 has the shape that is plane-symmetrical with the shape of the arm portion 52 with the virtual plane as a symmetrical plane, the virtual plane being orthogonal to the circumferential direction and passing through the circumferential center of the connection terminal 50. The arm portion 53 has structure and the like identical to those of the arm portion 52, and the identical structure and the like may not be described. The first arm portion 53*a* has a plate shape extending from an end portion of the first terminal body 51*a*, the end portion being on the second side (−θ side) in the circumferential direction, toward the second side in the circumferential direction. The second arm portion 53*b* has a plate shape extending radially inward from an end portion of the first arm portion 53*a*, the end portion being on the second side in the circumferential direction. The third arm portion 53*c* has a plate shape extending from a radially inner end portion of the second arm portion 53*b* toward the first side (+θ side) in the circumferential direction.

The arm recess 53*e* is a hole recessed from an end portion of the arm portion 53, the end portion being on the second side in the circumferential direction, toward the first side in the circumferential direction. The arm recess 53*e* is open toward both the sides in the radial direction. The groove 53*f* is a hole recessed from an end portion of the arm recess 53*e*, the end portion being on the first side in the circumferential direction, toward the first side in the circumferential direction. The groove 53*f* is open toward both the sides in the radial direction. As illustrated in FIG. 8, the wall portion 33*b* faces the groove 53*f* in the radial direction. The coil lead wire 34*c* is inserted through the groove 53*f* along the radial direction. As illustrated in FIG. 9, the groove 53*f* according to the present example embodiment includes a first groove 53*g* and a second groove 53*h*.

The first groove 53*g* is a hole recessed in the first arm portion 53*a*, the hole being recessed from the end portion of the arm recess 53*e*, the end portion being on the first side in the circumferential direction, toward the first side in the circumferential direction. The second groove 53*h* is a hole recessed in the third arm portion 53*c*, the hole being recessed from the end portion of the arm recess 53*e*, the end portion being on the first side in the circumferential direction, toward the first side in the circumferential direction. The first groove 53*g* and the second groove 53*h* are each open toward both the sides in the radial direction. The first groove 53*g* and the second groove 53*h* are disposed side by side in the radial direction. Although not illustrated, the lead wire contact portion 33*i* is located above a surface facing upward of each of the first groove 53*g* and the second groove 53*h* in the axial direction. That is, the lead wire contact portion 33*i* is located above a surface of the groove 53*f*, the surface facing upward. The lead wire contact portion 33*i* is also located below a surface of the groove 53*f*, the surface facing downward. One coil lead wire 34*c* is inserted through the first groove 53*g* and the second groove 53*h* in the radial direction.

Although not illustrated, each of the surface facing downward and the surface facing upward of the first groove 53*g* includes a pair of corner parts identical in shape to the corner parts 52*j* and 52*k* formed in the first groove 52*g* illustrated in FIG. 7. Each of the surface facing downward and the surface facing upward of the second groove 53*h* includes a pair of corner parts identical in shape to the corner parts 52*m* and 52*n* formed in the second groove 52*h*.

As illustrated in FIG. 9, the board connector 55 has a plate shape protruding upward, or toward the first side (+Z side) in the axial direction, from an upper end of the third terminal body 51*c*. The board connector 55 has a plate surface facing the radial direction. When viewed in the radial direction, the board connector 55 has a substantially elliptical shape with a major axis extending in the axial direction. The board connector 55 includes a hole passing through the board connector 55 in the radial direction. When viewed in the radial direction, the hole has a substantially elliptical shape with a major axis extending in the axial direction. The board connector 55 includes the hole, so that the board connector 55 is elastically deformable in the circumferential direction. The connection terminal 50 according to the present example embodiment includes two board connectors 55. One of the board connectors 55 protrudes upward from the one of the third terminal bodies 51*c*. The other of the board connectors 55 protrudes upward from the other of the third terminal bodies 51*c*. The two board connectors 55 are disposed at an interval in the circumferential direction.

As illustrated in FIG. 4, the board connector 55 of each connection terminal 50 passes through the second through-hole 70*b* of the circuit board 70 in the axial direction. Each board connector 55 is press-fitted into the second through-hole 70*b*. As described above, the board connector 55 is elastically deformable in the circumferential direction, so that each board connector 55 is fixed to the second through-hole 70*b* by restoring force of the board connector 55. Thus, each board connector 55 is connected to the circuit board 70. That is, the connection terminal 50 is connected to the circuit board 70. The connection terminal 50 is then electrically connected to the circuit board 70. Each board connector 55 can be fixed to the second through-hole 70*b* in the step of connecting the connection terminal 50 and the circuit board 70 according to the present example embodiment by inserting the board connector 55 into the inside of the second through-hole 70*b* by a simple work of moving the circuit board 70 downward from the upper side of the connection terminal 50 held in advance by the terminal holder 33. Thus, the connection terminal 50 and the circuit board 70 can be easily connected to each other, so that increase in the number of assembling steps of the motor 2 and the pump 1 can be suppressed.

As illustrated in FIG. 9, the leg portion 54 has a plate shape extending downward from the terminal body 51, or toward the second side (−Z side) in the axial direction. The leg portion 54 has an upper end that is at a substantially identical position to the lower end of the arm portion 52 in the axial direction. The leg portion 54 has a plate surface facing the radial direction.

When viewed in the radial direction, the leg portion 54 has a substantially rectangular shape with a long side extends in the axial direction. As illustrated in FIGS. 6 and 7, the leg portion 54 is disposed inside the hole 33*a* of the terminal holder 33. The leg portion 54 is in contact with each of the wall portion 33*b* and the first part 33*c* in the radial direction. Although not illustrated, the leg portion 54 is in contact with the second part 33*d* and the third part 33*e* in the circumferential direction. As illustrated in FIG. 9, the leg portion 54 includes a leg hole 54*b*. The leg portion 54 includes a fixture 54*c*.

The leg hole 54*b* passes through the leg portion 54 in the radial direction. When viewed in the radial direction, the leg hole 54*b* has a substantially rectangular shape with a long side extending in the axial direction. The fixture 54*c* has a plate shape extending from an upper surface among inner surfaces of the leg hole 54*b*, or a surface among them facing the first side (+Z side) in the axial direction, toward a direction facing a space between the upper side and the radially inside or the first side in the radial direction. The fixture 54*c* is elastically deformable in the radial direction. The fixture 54*c* has outer surfaces including a surface facing upward, or the first side in the axial direction, the surface serving as a fixing surface 54*d*. That is, the fixture 54*c* has the fixing surface 54*d* facing upward. As illustrated in FIG. 6, the fixing surface 54*d* is in contact with the support surface 33*m* of the terminal holder 33 in the axial direction. That is, the fixture 54*c* is in contact with the insulating portion 32 in the axial direction. The fixing surface 54*d* is supported in the axial direction by the support surface 33*m*.

According to the present example embodiment, the connection terminal 50 includes the leg portion 54 extending downward from the terminal body 51, or toward the second side (−Z side) in the axial direction, and including the fixture 54*c*, the insulating portion 32 includes the hole 33*a* recessed downward from the upper side of the insulating portion 32, or from the end portion on the first side in the axial direction, or recessed toward the second side in the axial direction, and the leg portion 54 is disposed inside the hole 33*a*. Thus, displacement of the leg portion 54 in the radial direction and the circumferential direction with respect to the insulating portion 32 can be suppressed by two inner surfaces of the hole 33*a*, the two inner surfaces facing the radial direction, and two inner surfaces of the hole 33*a*, the two inner surfaces facing the circumferential direction. As a result, a radial position and a circumferential position of the connection terminal 50 with respect to the insulating portion 32 can be accurately determined, so that a radial position and a circumferential position of the connection terminal 50 with respect to the circuit board 70 can be accurately determined. Thus, the board connector 55 of the connection terminal 50 can be easily inserted into the second through-hole 70*b* in the step of connecting the connection terminal 50 to the circuit board 70, so that the board connector 55 can be easily connected to the second through-hole 70*b*. Then, the connection terminal 50 and the circuit board 70 can be easily connected to each other, so that increase in the number of manufacturing steps of the motor 2 and the pump 1 can be suppressed.

According to the present example embodiment, the leg portion 54 includes the leg hole 54*b* passing through the leg portion 54 in the radial direction, and the fixture 54*c* extending from the upper surface among the inner surfaces of the leg hole 54*b*, or the surface among them facing the first side (+Z side) in the axial direction, toward the direction facing the space between the upper side and the radially inside or the first side in the radial direction, the fixture 54*c* being elastically deformable in the radial direction. Thus, when the leg portion 54 is inserted into the hole 33a in work of attaching the connection terminal 50 to the insulating portion 32, the fixture 54c comes into contact with the inner surface of the hole 33a to cause the fixture 54c to be elastically deformed radially outward. As a result, the fixture 54c can be prevented from being caught on the inner surface of the hole 33a, so that the leg portion 54 can be easily inserted into the hole 33a. As illustrated in FIG. 6, when the connection terminal 50 is inserted into the hole 33a until the fixture 54c is located below the support surface 33m, the fixture 54c elastically deforms radially inward due to restoring force of the fixture 54c. Thus, the fixture 54c enters the inside of the through-hole 33k to enable the fixing surface 54d and the support surface 33m to be brought into contact with each other in the axial direction. As a result, an axial position of the connection terminal 50 with respect to the insulating portion 32 can be determined, and the connection terminal 50 can be attached to the insulating portion 32. Thus, the connection terminal 50 can be attached to the insulating portion 32 only by simple work of moving the connection terminal 50 downward, so that the work of attaching the connection terminal 50 to the insulating portion 32 can be simplified. Then, increase in the number of manufacturing steps of the motor 2 and the pump 1 can be suppressed.

As illustrated in FIG. 8, a corresponding one of the coil lead wires 34c is connected to each of the arm portions 52 and 53 of each connection terminal 50 in the present example embodiment. That is, two coil lead wires 34c are connected to each connection terminal 50. Each of the two coil lead wires 34c is drawn out from a corresponding one of the pair of coil bodies 34a disposed across each connection terminal 50 in the circumferential direction. The pair of coil bodies 34a includes one coil body 34a disposed on the first side (+θ side) in the circumferential direction of the connection terminal 50, and one of the coil lead wires 34c drawn out from the one coil body 34a is connected to the arm portion 52. The pair of coil bodies 34a includes the other coil body 34a disposed on the second side (−θ side) in the circumferential direction of the connection terminal 50, and the other of the coil lead wires 34c drawn out from the other coil body 34a is connected to the arm portion 53.

As described above, the coil lead wire 34c is drawn from the coil body 34a toward the outside of the annular wall portion 32a in the radial direction through the insertion recess 32c. The one coil lead wires 34c drawn out from the coil body 34a toward the outside of the annular wall portion 32a in the radial direction is drawn out toward the terminal holder 33 on the second side (−θ side) in the circumferential direction, and is inserted through the inside of the recess 33h in the radial direction, the recess 33h being disposed on the first side in the circumferential direction of the two recesses 33h of the wall portion 33b, and is then inserted through the inside of the first groove 52g and the second groove 52h in the radial direction as illustrated in FIG. 7. That is, the one coil lead wire 34c is inserted through the inside of the groove 52f along the radial direction. The one coil lead wire 34c is also in contact with the lead wire contact portion 33i in the axial direction. As illustrated in FIG. 8, the other coil lead wire 34c drawn out toward the outside of the annular wall portion 32a in the radial direction is drawn out toward the terminal holder 33 on the first side in the circumferential direction, and is inserted through the inside of the recess 33h in the radial direction, the recess 33h being disposed on the second side in the circumferential direction of the two recesses 33h of the wall portion 33b, and is then inserted through the inside of the first groove 53g and the second groove 53h, which are not illustrated, in the radial direction. That is, the other coil lead wire 34c is inserted through the inside of the groove 53f along the radial direction. Although not illustrated, the other coil lead wire 34c is in contact with the lead wire contact portion 33i in the axial direction.

As illustrated in FIG. 7, a dimension of an interval between the corner parts 52j and 52k of the first groove 52g of the arm portion 52 is smaller than a diameter of the coil lead wire 34c. Additionally, a dimension of an interval between the corner parts 52m and 52n of the second groove 52h is smaller than the diameter of the coil lead wire 34c. Thus, the one coil lead wire 34c is press-fitted into each of the first groove 52g and the second groove 52h. That is, the one coil lead wire 34c is press-fitted into the groove 52f. As a result, the coil lead wire 34c and the arm portion 52 are connected to each other. Similarly, although not illustrated, a dimension of an interval between a pair of corner parts provided in the first groove 53g of the arm portion 53 is smaller than the diameter of the coil lead wire 34c. Additionally, a dimension of an interval between a pair of corner parts provided in the second groove 53h is smaller than the diameter of the coil lead wire 34c. Thus, the other coil lead wire 34c is press-fitted into each of the first groove 53g and the second groove 53h. That is, the other coil lead wire 34c is press-fitted into the groove 53f. As a result, the other coil lead wire 34c and the arm portion 53 are connected to each other. That is, the connection terminal 50 is connected to the coil portion 34. As described above, the circuit board 70 is connected to the board connector 55 of the connection terminal 50. Thus, the connection terminal 50 electrically connects the coil portion 34 to the circuit board 70.

According to the present example embodiment, the connection terminal 50 includes the board connector 55 connected to the circuit board 70, the grooves 52f and 53f that are recessed in the direction intersecting the axial direction and through which the coil lead wire 34c is inserted along the radial direction, and the fixture 54c in contact with the insulating portion 32 in the axial direction. The coil lead wire 34c is press-fitted into the grooves 52f and 53f, and the insulating portion 32 includes the wall portion 33b radially facing the grooves 52f and 53f and extending in the axial direction. The wall portion 33b includes the lead wire contact portion 33i located above the grooves 52f and 53f, or above a surface of each of them, the surface facing the first side (+Z side) in the axial direction, and in contact with the coil lead wire 34c in the axial direction. Thus, the coil lead wire 34c is bent downward from the lead wire contact portion 33i to the grooves 52f and 53f when viewed in the circumferential direction as illustrated in FIG. 7. Then, the coil lead wire 34c has a part located inside the grooves 52f and 53f, the part being subjected to restoring force directed upward, so that the coil lead wire 34c is pressed against surfaces of the grooves 52f and 53f, the surfaces facing downward. As a result, contact pressure between the surfaces of the grooves 52f and 53f facing downward and the coil lead wire 34c can be increased. Then, a contact area between the coil lead wire 34c and inner surfaces of the grooves 52f and 53f can be increased, so that the coil lead wire 34c and the connection terminal 50 can be stably and electrically connected to each other. Thus, the stator 30 and the circuit board 70 can be stably and electrically connected to each other with the connection terminal 50, so that the motor 2 and the pump 1 can be stably driven, and output efficiency of the motor 2 can be improved.

The lead wire contact portion 33i according to the present example embodiment is located above the surfaces of the grooves 52f and 53f, the surfaces facing upward. Thus, when the coil lead wire 34c attempts to move radially outward, the coil lead wire 34c is caught at an edge part connecting the lead wire contact portion 33i and a surface of the wall portion 33b, the surface facing radially inward. As a result, the coil lead wire 34c can be prevented from moving radially outward, so that the coil lead wire 34c and the connection terminal 50 can be more stably connected to each other. Thus, the stator 30 and the circuit board 70 can be more stably electrically connected to each other with the connection terminal 50.

The grooves 52f and 53f according to the present example embodiment are holes recessed in the circumferential direction, or in the direction intersecting the axial direction, so that the inside of the grooves 52f and 53f can be visually recognized from the outside of the connection terminal 50 in the circumferential direction. Thus, after work of connecting the coil lead wire 34c to the connection terminal 50 is performed, a connection state between the coil lead wire 34c and the inner surfaces of the grooves 52f and 53f can be visually recognized. As a result, the coil lead wire 34c and the connection terminal 50 can be electrically connected to each other more reliably.

According to the present example embodiment, the wall portion 33b includes the recess 33h that is recessed from the upper side of the wall portion 33b, or from the end portion of the wall portion 33b, the end portion being on the first side (+Z side) in the axial direction, toward the lower side, or the second side (−Z side) in the axial direction, and that is open along the radial direction, the coil lead wire 34c is inserted through the inside of the recess 33h, and the lead wire contact portion 33i is the surface facing upward among the inner surfaces of the recess 33h. Thus, the inner surface of the recess 33h, the inner surface facing the circumferential direction, can prevent the coil lead wire 34c from moving in the circumferential direction with respect to the terminal holder 33 and the connection terminal 50. Then, the coil lead wire 34c and the connection terminal 50 can be more stably connected to each other, so that the stator 30 and the circuit board 70 can be more stably and electrically connected to each other with the connection terminal 50.

According to the present example embodiment, the connection terminal 50 includes the terminal body 51 extending in the axial direction, and the arm portions 52 and 53 protruding from the terminal body 51 in the circumferential direction, or in the direction intersecting the axial direction, and including the grooves 52f and 53f, the grooves 52f and 53f including the first grooves 52g and 53g, and the second grooves 52h and 53h, which are aligned in the radial direction and through which one coil lead wire 34c is inserted. Thus, the coil lead wire 34c is press-fitted into each of the first grooves 52g and 53g, and the second grooves 52h and 53h, so that a contact area between the coil lead wire 34c and the connection terminal 50 can be increased and the coil lead wire 34c can be more firmly fixed to the connection terminal 50 as compared with structure in which the coil lead wire 34c is press-fitted into only one of the first grooves 52g and 53g or the second grooves 52h and 53h. As a result, the coil lead wire 34c and the connection terminal 50 can be more stably connected to each other, so that the stator 30 and the circuit board 70 can be more stably and electrically connected to each other with the connection terminal 50.

According to the present example embodiment, the connection terminal 50 includes the two arm portions 52 and 53, the one arm portion 52 protruding from the terminal body 51 toward the first side (+θ side) in the circumferential direction, and the other arm portion 53 protruding from the terminal body 51 toward the second side (−θ side) in the circumferential direction. Thus, the two coil lead wires 34c can be connected to one connection terminal 50, so that the connection terminal 50 provided in the motor 2 can be reduced in number as compared with structure in which one coil lead wire 34c is connected to one connection terminal 50. As a result, increase in the number of components and manufacturing cost of the motor 2 and the pump 1 can be suppressed.

According to the present example embodiment, the two arm portions 52 and 53 are disposed apart from each other in the circumferential direction, so that the coil lead wires 34c connected to the two respective arm portions 52 and 53 can be prevented from interfering with each other. Thus, the coil lead wire 34c can be connected to the connection terminal 50 more easily, so that increase in the number of manufacturing steps of the motor 2 and the pump 1 can be suppressed.

According to the present example embodiment, the fixture 54c has the fixing surface 54d facing upward, or toward the first side (+Z side) in the axial direction, and the insulating portion 32 has the support surface 33m facing downward, or toward the second side (−Z side) in the axial direction and supporting the fixing surface 54d in the axial direction. As described above, the lead wire contact portion 33i of the insulating portion 32 is located above the surfaces of the grooves 52f and 53f, the surfaces facing upward, in the present example embodiment, so that the coil lead wire 34c is bent downward from the lead wire contact portion 33i to the grooves 52f and 53f. Thus, restoring force of the coil lead wire 34c causes a force directed upward to be applied to the surfaces of the grooves 52f and 53f, the surfaces facing upward. That is, the force directed upward is applied to the connection terminal 50. For the force directed upward, the fixing surface 54d of the connection terminal 50, the fixing surface 54d facing upward, is supported in the axial direction by the support surface 33m of the insulating portion 32, the support surface 33m facing downward, in the present example embodiment, so that the connection terminal 50 can be prevented from moving upward with respect to the insulating portion 32. Thus, variations in position of the connection terminal 50 in the axial direction with respect to the circuit board 70 can be suppressed, so that the connection terminal 50 can be more easily connected to the circuit board 70. As a result, increase in the number of manufacturing steps of the motor 2 and the pump 1 can be more suitably suppressed.

The coil portion 34 according to the present example embodiment is composed of a coil wire in which the periphery of a copper wire is covered with an insulating film such as enamel. General examples of a method for electrically connecting the coil lead wire 34c to the connection terminal 50 when a coil wire as described above is used include a method for connecting the coil lead wire 34c to the connection terminal 50 after at least an insulating film of a part in contact with the inner surfaces of the grooves 52f and 53f is preliminarily removed, and a method for performing joining welding such as fusing welding in which a copper wire is joined to the connection terminal 50 while an enameled wire is melted.

In contrast, the first groove 52g of the arm portion 52 according to the present example embodiment has the inner surface provided with the corner part 52j having a shape pointed downward and the corner part 52k having a shape pointed upward as described above, the corner parts 52j and 52k facing each other in the axial direction at an interval in a dimension smaller than a diameter of the coil lead wire 34c. Thus, press-fitting the one coil lead wire 34c from the first side (+θ side) in the circumferential direction of the arm portion 52 into the first groove 52g without removing an insulating film on the one coil lead wire 34c enables the insulating film on the one coil lead wire 34c to be torn by the corner parts 52j and 52k, so that the inner surface of the first groove 52g and the copper wire of the coil lead wire 34c can be brought into contact with each other. Similarly, press-fitting the one coil lead wire 34c from the first side in the circumferential direction of the arm portion 52 into the second groove 52h without removing the insulating film on the one coil lead wire 34c enables the insulating film on the one coil lead wire 34c to be torn by the corner parts 52m and 52n, so that the inner surface of the second groove 52h and the copper wire of the one coil lead wire 34c can be brought into contact with each other. As a result, the arm portion 52 and the one coil lead wire 34c can be electrically connected to each other.

As described above, each of the first groove 53g and the second groove 53h of the arm portion 53 also includes a pair of corner parts. Thus, press-fitting the other coil lead wire 34c from the second side (−θ side) in the circumferential direction of the arm portion 53 into each of the first groove 53g and the second groove 53h without removing an insulating film of the other coil lead wire 34c, the insulating film of the other coil lead wire 34c can be torn by the pair of corner parts of each of the first groove 53g and the second groove 53h, so that the inner surface of each of the first groove 53g and the second groove 53h can be brought into contact with the copper wire of the other coil lead wire 34c. As a result, the arm portion 53 and the other coil lead wire 34c can be electrically connected to each other. Thus, the step of connecting the coil lead wire 34c to the connection terminal 50 does not require work of removing the insulating film of the coil lead wire 34c, so that the work of connecting the coil lead wire 34c to the connection terminal 50 can be simplified. Additionally, the coil lead wire 34c and the connection terminal 50 can be electrically connected only by simple work of press-fitting the coil lead wire 34c into the grooves 52f and 53f, so that the work of connecting the coil lead wire 34c to the connection terminal 50 can be simplified as compared with when the coil lead wire 34c and the connection terminal 50 are electrically connected to each other by joint welding such as fusing welding. Thus, increase in the number of manufacturing steps of the motor 2 and the pump 1 can be more preferably suppressed.

As described above, the lead wire contact portion 33i of the insulating portion 32 is located above the surfaces of the grooves 52f and 53f, the surfaces facing upward, in the present example embodiment, so that the coil lead wire 34c is bent downward from the lead wire contact portion 33i to the grooves 52f and 53f. As a result, tension directed in the radial direction is applied to the insulating film on an upper part of the coil lead wire 34c, so that the insulating film can be more stably torn by the pair of corner parts of each of the grooves 52f and 53f. Thus, the inner surfaces of the grooves 52f and 53f, and the copper wire of the coil lead wire 34c can be brought into contact with each other more stably, so that the coil lead wire 34c and the connection terminal 50 can be electrically connected to each other more stably.

The present disclosure is not limited to the above-described example embodiment, and other structures and other methods may be employed within the scope of the technical idea of the present disclosure. For example, the terminal holder provided in the insulating portion is not limited to three in number, and may be two or less, or four or more in number. The connection terminal provided in the motor is not limited to three in number, and may be two or less or four or more in number. The coil lead wire connected to the connection terminal may be one, or three or more in number. Alternatively, two or more coil lead wires may be connected to one arm portion.

The flange part provided in the board accommodating member may be three or more in number. The flange part may be also provided on the lid member or on the motor housing.

The method for connecting the board connector and the second through-hole is not limited to press-fitting, and the board connector and the second through-hole may be connected by another method such as soldering.

The application of the motor to which the present disclosure is applied is not particularly limited. The motor may be mounted on a device other than the pump. Use of the pump including the motor to which the present disclosure is applied is not particularly limited. Fluid to be fed by the pump is not particularly limited in type, and may be water or the like. The motor and the pump may be mounted on a device other than a vehicle. Each structure and method described herein can be combined as appropriate within a scope without contradictory to each other.

The present techniques can be configured as described below.

(1) A motor including: a motor assembly including a rotor rotatable about a central axis and a stator radially opposing the rotor with a gap interposed between the rotor and the stator; a circuit board located on a first side in an axial direction from the motor assembly; and a connection terminal electrically connecting the stator and the circuit board; wherein the stator includes: a stator core with an annular shape; an insulating portion attached to the stator core to hold the connection terminal; and a coil portion including a coil body attached to the stator core with the insulating portion interposed between the stator core and the coil body, and a coil lead wire drawn out from the coil body; the connection terminal includes: a board connector connected to the circuit board; a groove recessed in a direction intersecting the axial direction to allow the coil lead wire to be inserted through the groove along a radial direction; and a fixture in contact with the insulating portion in the axial direction, the coil lead wire being press-fitted into the groove; the insulating portion includes a wall portion opposing the groove in the radial direction and extending in the axial direction; and the wall portion includes a lead wire contact portion that is located on the first side in the axial direction from a surface of the groove opposing the first side in the axial direction and in contact with the coil lead wire in the axial direction.

(2) The motor according to item (1), in which the wall portion includes a recess that is recessed from an end portion of the wall portion, the end portion extending from the first side in the axial direction toward a second side in the axial direction and that is open along the radial direction; the coil lead wire is inserted into the recess; and the lead wire contact portion is a surface among inner surfaces of the recess, the surface opposing the first side in the axial direction.

(3) The motor according to item (1) or (2), in which the connection terminal includes a terminal body extending in the axial direction, and an arm portion protruding from the terminal body in a direction intersecting the axial direction and including the groove; and the groove includes a first groove and a second groove that are aligned in the radial direction and through which one coil lead wire is inserted.

(4) The motor according to item (3), in which the connection terminal includes two of the arm portions; a first of the two of the arm portions protrudes from the terminal body toward a first side in a circumferential direction; and a second of the two of the arm portions protrudes from the terminal body toward a second side in the circumferential direction.

(5) The motor according to item (3) or (4), in which the fixture includes a fixing surface opposing the first side in the axial direction; and the insulating portion includes a support surface opposing the second side in the axial direction and supporting the fixing surface in the axial direction.

(6) The motor according to item (5), in which the connection terminal includes a leg portion extending from the terminal body toward the second side in the axial direction and including the fixture; the insulating portion includes a hole recessed from an end portion of the insulating portion, the end portion extending from the first side in the axial direction toward the second side in the axial direction; and the leg portion is located inside the hole.

(7) The motor according to item (5) or (6), in which the leg portion includes a leg hole passing through the leg portion in the radial direction; and the fixture extends from a surface among inner surfaces of the leg hole, the surface opposing the first side in the axial direction, toward a direction opposing a space between the first side in the axial direction and the first side in the radial direction, and is elastically deformable in the radial direction.

(8) A pump including: the motor according to any one of items (1) to (7); and a pump mechanism connected to the rotor.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a motor assembly including a rotor rotatable about a central axis and a stator radially opposing the rotor with a gap interposed between the rotor and the stator;
   a circuit board located on a first side in an axial direction from the motor assembly; and
   a connection terminal electrically connecting the stator and the circuit board; wherein
   the stator includes:
      a stator core with an annular shape;
      an insulating portion attached to the stator core to hold the connection terminal; and
      a coil portion including a coil body attached to the stator core with the insulating portion interposed between the stator core and the coil body, and a coil lead wire drawn out from the coil body;
   the connection terminal includes:
      a board connector connected to the circuit board;
      a groove recessed in a direction intersecting the axial direction to allow the coil lead wire to be inserted through the groove along a radial direction; and
      a fixture in contact with the insulating portion in the axial direction, the coil lead wire being press-fitted into the groove;
   the insulating portion includes a wall portion opposing the groove in the radial direction and extending in the axial direction; and
   the wall portion includes a lead wire contact portion that is located on the first side in the axial direction from a surface of the groove opposing the first side in the axial direction and in contact with the coil lead wire in the axial direction.

2. The motor according to claim 1, wherein
the wall portion includes a recess that is recessed from an end portion of the wall portion, the end portion extending from the first side in the axial direction toward a second side in the axial direction and that is open along the radial direction;
the coil lead wire is inserted into the recess; and
the lead wire contact portion is a surface among inner surfaces of the recess, the surface opposing the first side in the axial direction.

3. The motor according to claim 1, wherein
the connection terminal includes a terminal body extending in the axial direction, and an arm portion protruding from the terminal body in a direction intersecting the axial direction and including the groove; and
the groove includes a first groove and a second groove that are aligned in the radial direction and through which one coil lead wire is inserted.

4. The motor according to claim 3, wherein
the connection terminal includes two of the arm portions;
a first of the two of the arm portions protrudes from the terminal body toward a first side in a circumferential direction; and
a second of the two of the arm portions protrudes from the terminal body toward a second side in the circumferential direction.

5. The motor according to claim 3, wherein
the fixture includes a fixing surface opposing the first side in the axial direction; and
the insulating portion includes a support surface opposing the second side in the axial direction and supporting the fixing surface in the axial direction.

6. The motor according to claim 5, wherein
the connection terminal includes a leg portion extending from the terminal body toward the second side in the axial direction and including the fixture;
the insulating portion includes a hole recessed from an end portion of the insulating portion, the end portion extending from the first side in the axial direction toward the second side in the axial direction; and
the leg portion is located inside the hole.

7. The motor according to claim 6, wherein
the leg portion includes a leg hole passing through the leg portion in the radial direction; and
the fixture extends from a surface among inner surfaces of the leg hole, the surface opposing the first side in the axial direction, toward a direction opposing a space between the first side in the axial direction and the first side in the radial direction, and is elastically deformable in the radial direction.

8. A pump apparatus comprising:
the motor according to claim 1; and
a pump connected to the rotor.

* * * * *